April 1, 1930.　　M. H. ROBERTS ET AL　　1,752,696
FLEXIBLE CONNECTION FOR LOCOMOTIVE BOOSTERS
Filed Dec. 28, 1926
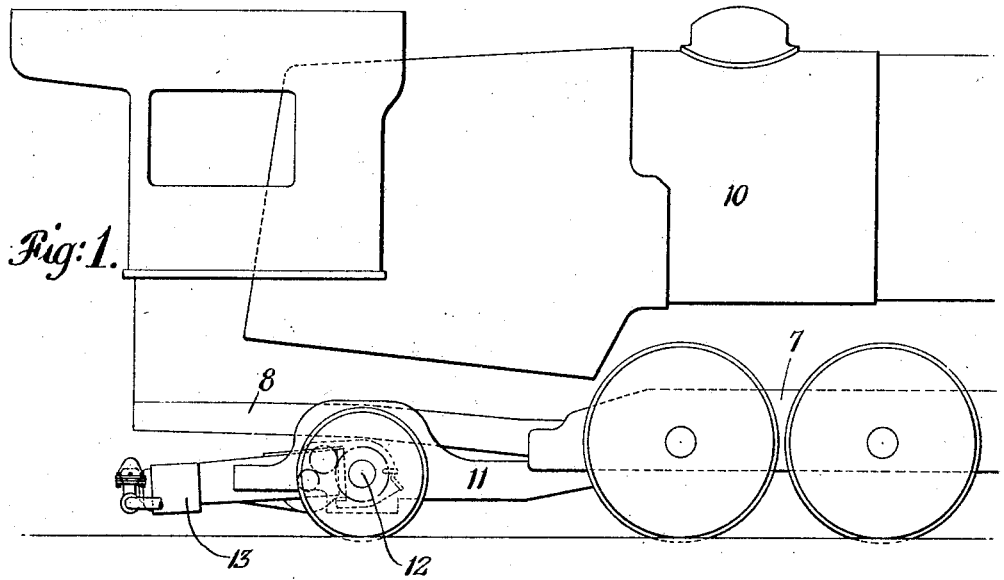
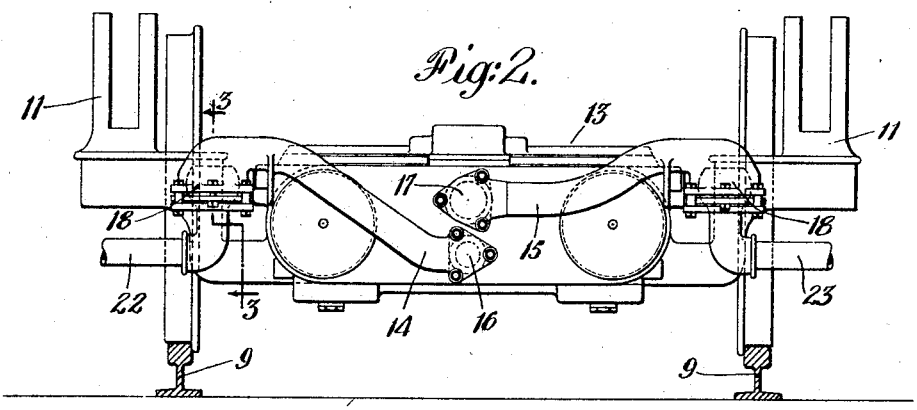
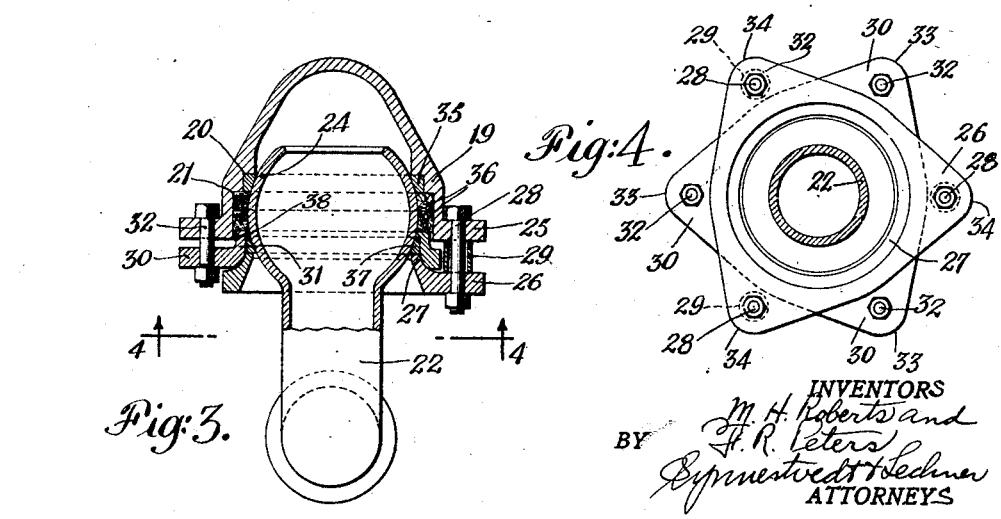
INVENTORS
M. H. Roberts and
H. R. Peters
BY
Byrnestvedt & Lechner
ATTORNEYS Patented Apr. 1, 1930

1,752,696

UNITED STATES PATENT OFFICE

MONTAGUE H. ROBERTS, OF ENGLEWOOD, NEW JERSEY, AND FRANK R. PETERS, OF NEW YORK, N. Y., ASSIGNORS TO FRANKLIN RAILWAY SUPPLY COMPANY, OF NEW YORK, N. Y., A CORPORATION OF DELAWARE

FLEXIBLE CONNECTION FOR LOCOMOTIVE BOOSTERS

Application filed December 28, 1926. Serial No. 157,512.

This invention relates to improvements in flexible connections, and more particularly to such joints as are adapted for use in the steam lines of locomotive booster engines where the clearances are extremely limited because of the close proximity to the truck frame, brake rigging and other apparatus.

Accordingly, it is among the principal objects of this invention to provide a flexible joint connection for use with the booster which is compact and simple.

A further object of the invention is the provision of a joint connection of the ball type wherein the bodies of the cooperating ball joint elements are cast integral with their respective steam connections.

A still further object of the invention is the provision of flexible connections for conveying steam to the booster and exhaust steam therefrom in which the number of joints are reduced to a minimum, with the result that possibility of steam leaking is materially reduced.

A still further object of the invention is the provision of flexible connections the weight of which is considerably reduced without sacrificing the strength necessary to resist the strains and stresses to which they are subjected while in use.

Other objects of the invention will appear more fully hereinafter.

In the accompanying drawings:

Fig. 1 shows a side elevation of a portion of the locomotive and trailing truck upon which the booster engine and its steam connections are mounted;

Fig. 2 shows a rear view of the booster engine and the inlet and exhaust steam connections therefor;

Fig. 3 shows a view in vertical cross section taken on the line 3—3 of Figure 2; and Fig. 4 shows a view taken on the line 4—4 of Fig. 3.

The same part is designated by the same reference numeral whenever it occurs throughout the several views.

Referring more particularly to the drawings. Fig. 1 shows a locomotive 10 and the truck frame 11 to the axle 12 of which the booster engine 13 is operatively engaged. This booster engine 13 is provided with steam supply and exhaust connections 14 and 15, the inner ends of which are connected to the steam chest of the engine as at 16 and 17, respectively. Due to the extremely small head room betwen the rails 9 and the rear extension 8 of the locomotive frame 7, some difficulty has been encountered heretofore in locating these connections 14 and 15 properly with respect to the booster engine. In order to overcome this difficulty this invention contemplates the elimination of all unnecessary joints by providing that the pipe connections 14 and 15 themselves embody elements of the flexible joints.

These latter joints are essentially of the ball and socket type, as generally indicated by the reference numeral 18, and are provided at the outer ends of the connections 14 and 15. As is more particularly shown in Fig. 3, each of these latter connections are provided at their free ends with integrally formed substantially semi-spherical sockets or seats 19, the internal surfaces of which are provided with annular shoulders 20 and 21. Connections 22 and 23 leading to the source of steam supply and to the exhaust port, respectively, are in turn provided at their inner ends with integrally formed spherical or ball shaped heads 24 arranged to be received within the sockets 19 of the adjacent connections 14 and 15.

In order to prevent displacement of each head 24 from its socket 19, the latter is provided with a substantially annular flange 25 and a ring or collar 26 is provided having an axially extending inner portion 27. This axially extending inner portion is of a diameter somewhat less than the external diameter of the head 24 and is retained in cooperative relation with the seat 19 by means of a plurality of bolts 28 which extend through the flange 25 and the collar 26. Spacers 29 are provided for maintaining a definite spaced relationship between the seat 19 of the joint and the collar 26.

Interposed between the members 19 and 26 is a ring or collar 30, this member also being provided with an axial extension 31, the external diameter of this extension being such that it may be drawn into the opening in the bottom of the spherical seat 19 by means of the bolts 32. In order to prevent any interference between the bolts 28 and the intermediate collar 30 and between the bolts 32 and the lower collar 26, these collars 26 and 30 are preferably of triangular form and are superimposed one above the other in such manner that the adjacent apexes 33 and 34 of the respective members are displaced by approximately 60 degrees. This arrangement is clearly shown in Figure 4.

An annular ring 35 is seated in the internal shoulder 20 and affords an inner bearing surface for the spherical head 24 of the connection 22 or 23, as the case may be. Interposed between this annular bearing ring and the free transverse edge of the collar 30 and seated within the shoulder 21 are one or more packing elements 36 which may be more or less compressed to provide a seal against leakage of the steam upon axially drawing the collar 30 within the seat 19 by means of the bolts 32. An outer bearing surface for the spherical head 24 is afforded by the annular ring 37 which is suitably positioned for this purpose between the inner edge of the collar 26 and an internal flange 38 formed on the inner edge of the intermediate collar 30.

The spacers 29 which surround the bolts 28 to maintain the members 25 and 26 in spaced relation effectually preclude any binding tendency between the head 24 and its seat 19, the leakage of steam being entirely prevented solely by the action of the intermediate member 30 bearing against the packing elements 36. By virtue of the fact that the head 24 is nested within its seat 19, the overall depth of the joint is materially reduced which makes possible its use even in these extremely small spaces which are usually afforded between the booster engines and the truck frames. Not only is the depth of the joint considerably reduced but the effective length of the connections is also decreased due to the fact that the necessity for separate joints between the meeting ends of the connections 14, 15 and 22, 23 are eliminated.

It will be seeen that the steam connection which we have provided is simple, compact and light in weight. By forming the joints 18 as disclosed with the socket members 19 cast integral with the connections 14 and 15 they can be brought in as far as possible toward the margins of the booster. The socket members 19 project only a short distance beyond the sides of the booster and they are very close to the plane of the rear end.

It is, of course, to be understood that the flexible joints as described above may be employed with equal effect at other points in the supply and exhaust lines, the construction of the joints being such that they cooperate with each other to produce a flexible connection which gives with each movement of the booster engine relative to its associated parts without causing any untoward separation of the joint elements as would permit any leakage of steam.

We claim:—

1. In a flexible connection for a booster steam line, the combination of a steam conduit secured to the rear of the booster engine and a downwardly opening socket member cast integral with said conduit through which the connection is made.

2. In a steam connection for locomotive boosters, the combination of steam supply and exhaust conduits secured to and lying along the end of the booster, and a downwardly opening socket member on each conduit cast integral therewith and projecting outwardly beyond the sides of the booster but lying substantially in the plane of said conduits.

3. In a flexible connection for a booster steam line, the combination of a steam conduit secured to the rear of the booster engine and a socket member cast integral with said conduit and opening downwardly at a point substantially in the plane in which the top of the booster lies.

4. In a flexible connection for a booster steam line, the combination of a steam conduit one end of which is secured to the booster engine and the other end of which is extended to one side of said engine adjacent the top thereof and a socket member cast integral with said conduit at the second mentioned end thereof and opening downwardly therefrom.

In testimony whereof, we have hereunto signed our names.

MONTAGUE H. ROBERTS.
FRANK R. PETERS.